Jan. 1, 1929.
J. S. CURRAN
1,697,457
DIFFERENTIAL MECHANISM
Filed April 4, 1928   2 Sheets-Sheet 1
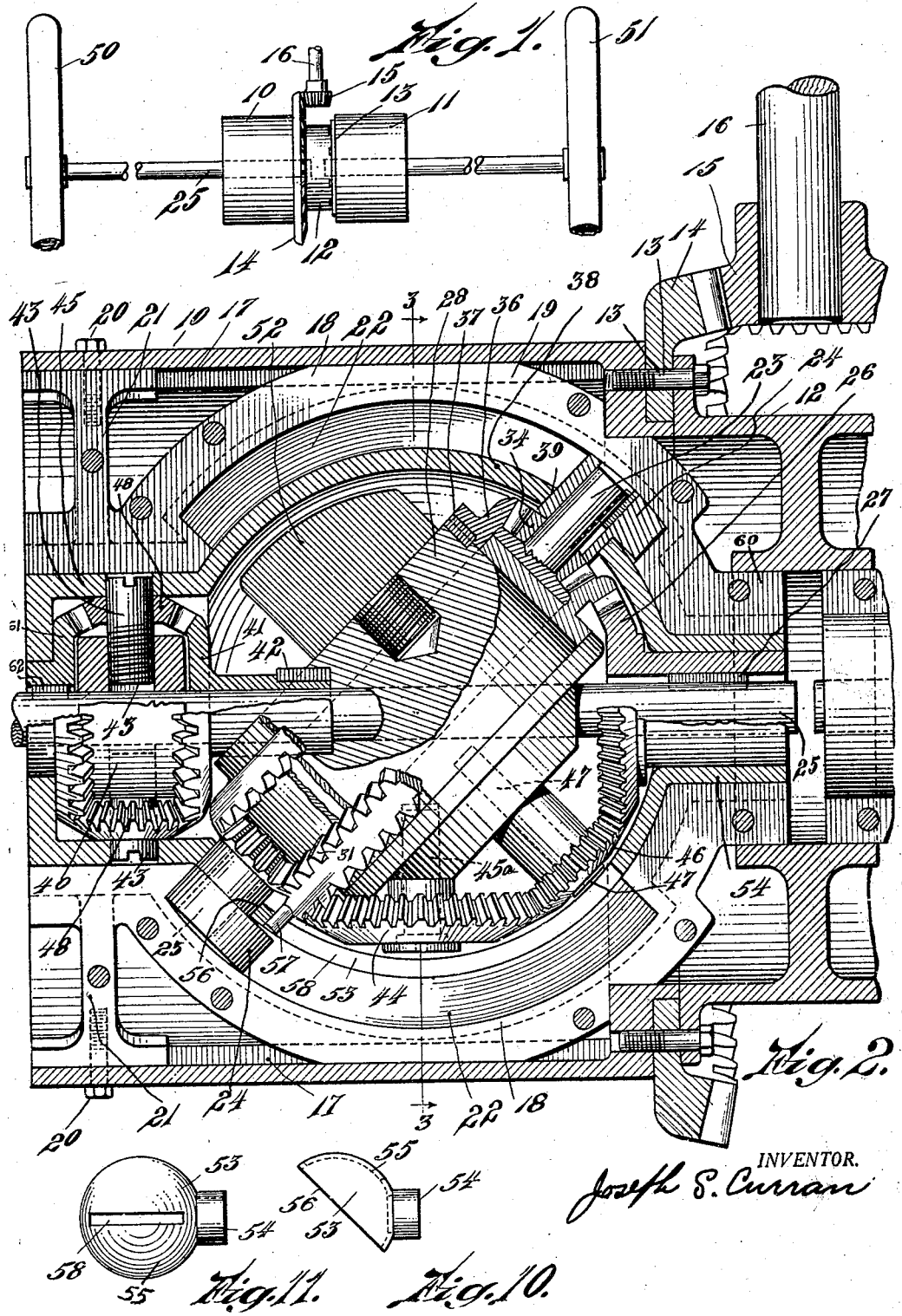
INVENTOR.
Joseph S. Curran Jan. 1, 1929.
J. S. CURRAN
1,697,457
DIFFERENTIAL MECHANISM
Filed April 4, 1928
2 Sheets-Sheet 2
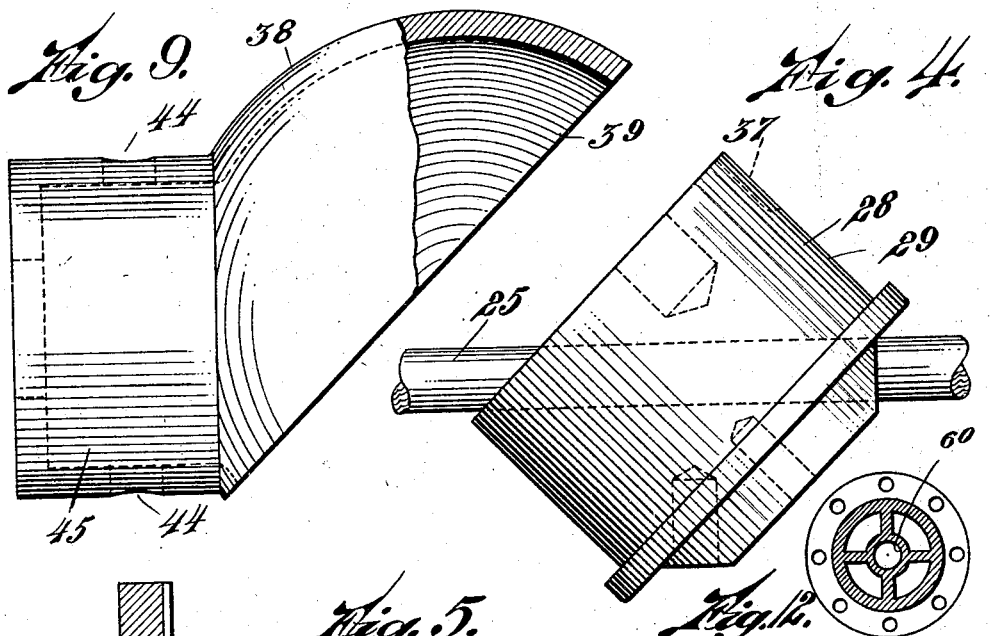
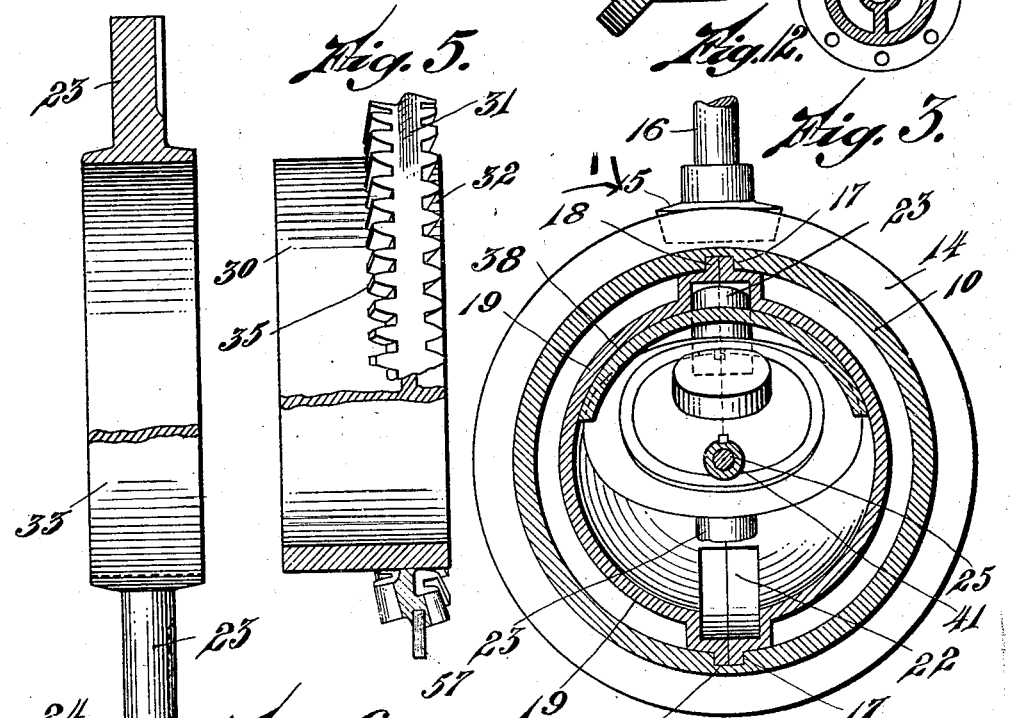
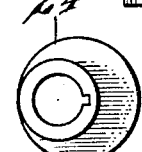
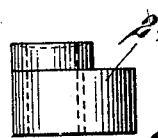
INVENTOR.
Joseph S. Curran Patented Jan. 1, 1929.

1,697,457

UNITED STATES PATENT OFFICE.

JOSEPH S. CURRAN, OF PROVIDENCE, RHODE ISLAND, ASSIGNOR OF ONE-HALF TO ALBERT E. GOODBY, OF PROVIDENCE, RHODE ISLAND.

DIFFERENTIAL MECHANISM.

Application filed April 4, 1923. Serial No. 267,319.

This invention relates to improved mechanical movements and has for its object to provide a mechanism by which I obtain certain mechanical movements to be utilized for purposes for which they may be adapted.

The invention has for one of its objects to provide in such a mechanism a driven rotatable casing having a shaft supporting housing mounted therein and driven thereby and to provide an arrangement of differential gearing mounted on the shaft in said housing by means of which the shaft may be driven in the same direction as the casing and at a speed equal to or greater than the casing speed.

The invention further consists in providing a mechanical movement having two shafts in axial alignment which are driven independently of each other by two separate differential mechanisms, a common drive being provided for both of said differential mechanisms.

A still further object of the invention is the provision of a casing formed of two separate cylindrical members, said members being connected together by an intermediate member, each of said cylindrical members to drive a housing for each of two separate differential mechanisms, one in each of said housings and a driven shaft supported in each of said housings to be driven independently each by its own differential mechanism.

A still further object of the invention is the provision of a mechanism that is adapted to propel a vehicle through its driving wheels driven together or through either one of these driving wheels alone, if for any reason the other driving wheel becomes inoperative.

A still further object of the invention is the provision of means for driving two gears that are directly connected together by a multiple driving force operating on diametrically opposite sides of said gears.

With these and other objects in view, the invention consists of certain novel features of construction, as will be more fully described and particularly pointed out in the appended claims.

In the accompanying drawings:

Figure 1 is a view illustrating the two casings in which are mounted the housings for the differential mechanisms and the supporting shafts shown as being connected to the vehicle driving wheels.

Figure 2 is a central sectional view through the differential mechanism mounted in one of the housings and casing section member.

Figure 3 is a section on line 3—3 of Figure 2 showing the circular arrangement of a casing member with the drive slots therein and the driving guide grooves in the housing for the power transmitting trunnions of the spider.

Figure 4 shows the cam journal member rotatably mounted on its shaft with the working peripheral surface diagonally disposed to the axis of the shaft.

Figure 5 is a view of the double faced bevel gear which is adapted to be rotatably mounted on the cam journal member.

Figure 6 is a detail partly in section of the power transmitting spider which is rotatably mounted on the hub of the double faced bevel gear.

Figure 7 is a bushing for guiding the spider trunnion in its sliding motion in the housing guide grooves.

Figure 8 is a top view of this bushing.

Figure 9 is a side elevation partly in section of one of the cam members which controls the movement of the spider on the hub of the double faced bevel gear and the trunnions of said spider in the housing guide grooves.

Figure 10 is a side elevation partly in section of the double bevel gear operated control cam that assists in the control of the movement of the spider on the hub of the double bevel gear.

Figure 11 is a top view of this cam shown in Fig. 10.

Figure 12 is a sectional end view of the intermediate connecting member for the casing sections.

In the usual differential mechanism for driving motor vehicles both driving wheels are driven through a single differential mechanism, whereby one wheel rotates at the expense of the other if one wheel slips or spins as would be the case on slippery surfaces and the other wheel loses its driving power, but with my improved mechanism the two wheels are driven in unison, yet each is driven independently of the other and if one loses its driving power this does not affect the driving power of the other wheel.

In some instances, it is also found of advantage to provide a single differential mechanism having a single shaft which may be driven at a speed equal to or greater than the speed of the casing and the following is a detailed description of the present embodiment of my invention and showing one arrangement of mechanism by which these advantageous results may be accomplished:—

With reference to the drawings, 10 and 11 designate a pair of cylindrical casings which are spaced apart and connected together by an intermediate member 12 through bolts 13 and to one of these casing members where the connector member is bolted thereto is mounted the drive gear 14 which meshes with the drive pinion 15 fixed to drive shaft 16. Each of these casing members is arranged to receive and drive a duplicate housing member 19, each of which is arranged to have a duplicate set of differential mechanism. Each casing member is slotted longitudinally as at 17 on its inner surfaces to serve as a drive slot for transmitting power and serve to receive the ribs 18 on the inner housing member 19. These inner housing members are also connected to the casing members by bolts 20 in the spokes 21 of the housing which serve as end bearings for the casing and which are also provided with a rib or tongue connection with the slot in said casing member. These inner housing members 19 may be substantially spherical in shape on the inner and outer surfaces and are formed of two sections fastened together by bolts passed through the holes shown in their ribs provided therefor. These housing members are also provided with internal arcuately shaped longitudinally disposed guide grooves 22 through which power is transmitted to the inclosed differential mechanism through the trunnions 23 of the spider on which are mounted the bushings 24 arranged to slide in the guide grooves 22 when desired.

These housing members are provided with a second end bearing as at 60 to engage the means provided therefore in the intermediate connecting member and the said bearings of the inner housings serve to support the casing in alignment when both of the housings are mounted therein or if for any reason, such as a replacement of parts, either of said housings is removed from said casing.

The differential mechanism in these inner housings is supported on the driven shaft 25 to one end of which is fixed the shaft gear 26 by the key 27; also on the driven shaft is mounted the cam journal member 28 which is not fixed to said shaft but may freely rotate thereon, see Fig. 4.

This shaft extends diagonally through the cam journal member and the working peripheral surface 29 of this cam journal is set diagonally to the axis of the shaft. On this cam journal is rotatably mounted the hub 30 of the double bevel gear 31. One set of teeth 32 on the double bevel gear 31 mesh with the shaft gear 26.

On the hub 30 of the double beveled gear 31 is mounted the power transmitting spider hub 33 which is provided with the above mentioned trunnions 23 and on these trunnions are loosely mounted the pinions 34, one side of which is arranged to engage the teeth 35 of the double beveled gear 31 while the other side of these pinions engage the teeth of the cam journal gear 36 which is keyed as at 37 to said journal 28 so that as the casing 10 is rotated it transmits power through the housing to the spider and from the pinions 34 on the spider through the double bevel gear 31 to the shaft gear 26 to rotate the shaft 25, said spider trunnions 23 being controlled by the co-operating cam members 38 and 53 to provide a unitary motion of said shaft 25 with casing 10.

In order to control said spider trunnions 23 and the traverse motion of the bushings 24 in their guide grooves 22 to provide said unitary motion of the shaft and attached driving wheel 50 by said co-operating cam members 38 and 53 shown in Figures 9, 10 and 11, and, also permit the driving wheel 50 to be driven faster than the casing or the other driving wheel 51, I have mounted these control cams 38 and 53 so that their respective cam surfaces 39 and 56 are continually in a plane parallel with the said trunnions 23 and I arranged to rotate cam member 38 at the proper time and speed through a set of differential gearing 40 which is driven from the cam journal member 28 through gear 41 which is keyed at 42 thereto. The trunnion pins 43 of this control cam differential gearing on which pinions 48 are mounted are arranged to extend into bearing openings 44 in the hub 45 of this control cam so that this cam is caused to be advanced through this mechanism at a speed to cause the cam journal member 28 and its attendant structure mounted thereon to be driven in unison with the casing and housing thus causing a consequent unitary motion of the shaft and driving wheel. This same arrangement of the cam members in conjunction with the cam journal member and attendant structure is adapted to permit a retarding or slower movement of gear 36 and the cam journal 28 which then allows the speed of the shaft 25 to be increased over that of the driving casing, by which construction it will be seen that the vehicle wheel 50 taking the outer or larger curve in turning a corner is permitted to run at a speed greater than that of the other wheel 51 taking the smaller circle and also run at a speed greater than that of the driving casing, the speed of the outer wheel 50 being increased at the expense of its own differential mechanism and not at the expense of the other shaft or its differential mechanism.

The second co-operating cam 53 is positioned on the opposite side of the cam journal and its mechanism from the cam 38, said cam 53 having a hub portion 54 and cam surface 56 arranged to engage the opposite sides of the spider guides 24, this cam 53 being rotated by a guide trunnion 57 of the double bevel gear 31 which extends into the slot 58 in the body of this cam which slot permits the double bevel gear 31 to rotate with the cam journal 28 and rotate said cam 53 to assist cam 38 to provide a unitary motion of the shaft and driving wheel with the driving casing.

In order to provide a means to rotate the shaft gear 26 from diametrically opposite sides of said gear to provide a double driving force on said gear 26, I have arranged a train of gearing which comprises the bevel gear 44 mounted on the pin 45ª and carried by the cam journal 28, one side of said gear meshes with the teeth 32 of the double bevel gear 31 while its opposite side is connected to the shaft gear 26 through the gear 46 that is mounted on the pin 47 also carried by the cam journal 28, by which arrangement of gearing I am enabled to engage and drive the shaft through its bevel gear 26 from diametrically opposite sides as this gear meshes direct on one side with the gear 31 and is driven on its opposite side from gear 31 through gears 46 and 44, which gear 44 also meshes with gear 31.

The member 52 fixed to the cam journal is for the purpose of counterbalancing the weight of the gears 44 and 46 when desired.

The foregoing description is directed towards the construction illustrated, but I desire it to be understood that I reserve the privilege of resorting to all the mechanical changes to which the device is susceptible, the invention being defined and limited only by the terms of the appended claims.

I claim:

1. In a differential mechanism, a casing formed of two spaced cylindrical sections, a drive slot in each casing section, a connecting member for said casing sections, a sectional housing formed of two parts and provided with ribs having holes therein to fasten said parts together, said ribs engaging the drive slots in said casing section to drive said housing and allow said housing to be readily endways removed from said casing section, and means to rotate said casing.

2. In a differential mechanism, a rotatable sectional casing formed in two spaced cylindrical sections having drive grooves, an intermediate member connecting said sections and having a bearing provided therein, an oil carrying gear housing member in each casing section each formed in two parts operatively connected together and having tongue and groove connection with said casing to be rotated thereby and to be endways removable therefrom, a means on the inner end of said housings to engage the bearing provided therefor in the intermediate connector member, bearings on the opposite end of said housing provided with tongues to engage the drive grooves of the casing said bearings also to provide removable supports for the casing and means to rotate said casing.

3. In a differential mechanism, a rotatable sectional casing having a drive groove to engage and drive a housing, means to drive said casing, a housing in said casing, a shaft in said housing, a cam journal rotatably mounted on said shaft, a gear fixed to said cam journal, a spider member rotatably mounted and having members slidably engaging said housing to move longitudinally therein, a cam member driven from the cam journal member and the shaft, a gear fixed to said shaft, differential gearing connecting said shaft to said cam journal, whereby rotation of said casing will rotate said shaft at the same speed in the same direction, or said shaft may be rotated in the same direction as said casing and at a different speed than that of said casing.

4. In a differential mechanism, a rotatable sectional casing having drive grooves to engage and drive a housing, means to rotate said casing, a housing in said casing, a shaft in said housing, a cam journal member rotatably mounted on said shaft, a gear fixed to said cam journal member, a double faced bevel gear rotatably mounted on said cam journal member, a spider member rotatably mounted on the hub of said double bevel gear and having members engaging said housing to move longitudinally therein, a cam member driven from the cam journal member and shaft respectively, a gear fixed to said shaft connecting said shaft to said cam journal, a trunnion fixed to said double bevel gear, a co-operating second cam member driven from said double bevel gear, a train of gears carried by said cam journal member connecting said shaft to said cam journal, whereby rotation of said casing will rotate said shaft at the same speed in the same direction, or said shaft may be rotated in the same direction as the casing and at a different speed than that of said casing.

5. In a differential mechanism, a casing formed of two spaced cylindrical sections operatively connected together, a connecting member for said sections, an oil tight gear carrying housing in each casing section mounted to be driven thereby and readily removed endways therefrom, and means for rotating said casing.

6. In a differential mechanism, a rotatable sectional casing formed of two cylindrical section members having drive grooves, said sections operatively connected together by an intermediate connecting member having a bearing member provided therein, a sectional housing member in each of said casing sections having tongues to engage said drive grooves of said casing members to be driven thereby and having internal arcuately shaped guide grooves therein, co-axial shafts, one in each of said housings, a cam journal member rotatably mounted, one on each of said shafts, a double bevel gear mounted on each of said cam journal members, a spider member having trunnions said trunnions carrying bushings to engage the guide grooves of said housings and being rotatably mounted on the hub of said double bevel gear, a cam member rotatably mounted and driven by each of said cam journal members and shaft respectively, a gear fixed to said cam journal members, pinions rotatably mounted on said spider trunnions, a gear fixed to each of said shafts to connect said shafts to their cam journal members respectively through said cam journal gear, spider trunnions, pinions, and double bevel gear, a trunnion fixed to said double bevel gear, a co-operating second cam driven from said double bevel gear, a train of gears carried by said cam journal member in each of said housings, whereby rotation of said casing will rotate said shafts independent of each other in the same direction at the same speed, or either of said shafts may be rotated at different speeds in the same direction and also independent of each other.

7. In a differential mechanism, two separate cylindrical casing members operatively connected together to be driven in unison, a sectional housing member in each casing member, a separate differential mechanism in each housing member, a driven shaft supported in each housing member and connected to be driven independently by its differential mechanism, and means for driving said casing.

8. In a differential mechanism, a casing having a drive slot to engage and drive a housing, a housing having guide grooves and removably mounted in said casing and driven thereby, means to drive said casing and housing, a shaft in said housing, a gear fixed to said shaft, a cam journal member rotatably mounted on said shaft with its working peripheral face set on an angle to said shaft, a gear fixed to said journal member, a double bevel gear rotatably mounted on said journal member, a pin in said double gear, a spider rotatably mounted on the hub of said double gear, having members engaging the groove in said housing to be driven thereby and carrying pinion gears connecting said journal member through its gear to said shaft, a cam member having a groove to engage said pin in said double gear and driven thereby for controlling the movement of said spider in said housing groove and said journal member to provide unitary motion of said shaft with said casing and housing, or said shaft may be rotated at a different speed than the speed of said casing and housing.

9. In a differential mechanism, a sectional casing, two sectional housings in said casing, a shaft supported in each of said housings, a differential mechanism in each of said housings for driving said shafts independently of each other, means connecting said casing and housings adapted to permit said housings to be endwise removed from said casing and means to rotate said casing.

10. In a differential mechanism, a casing having a drive slot to engage and drive a housing, a housing having a guide groove and removably mounted in said casing and driven thereby, means to rotate said casing and housing, a shaft journaled in said housing, a gear fixed to said shaft, a cam journal member rotatably mounted on said shaft with its working peripheral face set on an angle to said shaft, a gear fixed to said journal member, a double bevel gear rotatably mounted on said journal member, a spider rotatably mounted on the hub of said double gear having means engaging said housing groove to be driven thereby and carrying pinion gears connecting said journal member to said shaft through said journal gear, said double gear and said shaft gear, a second gear fixed to said shaft, a gear rotatably mounted on said shaft and connected to said journal member, a spider rotatably mounted on said shaft, pinion gears rotatably mounted on said spider connecting said second fixed gear to said rotatable gear, a cam member rotatably mounted and driven by said spider for controlling the movement of said first spider in said guide grooves to provide unitary motion of said shaft with said casing and housing.

In testimony whereof I affix my signature.

JOSEPH S. CURRAN.